United States Patent [19]  [11] 4,095,213
Hayden  [45] June 13, 1978

[54] MECHANICALLY ACTUABLE CONTROL RELAY

[75] Inventor: Rodney Hayden, Stoney Creek, Canada

[73] Assignee: TRW Inc., Cleveland, Ohio

[21] Appl. No.: 757,523

[22] Filed: Jan. 7, 1977

[51] Int. Cl.² .................. G08B 21/00; H01H 1/12; H01H 51/06
[52] U.S. Cl. .................. 340/252 R; 335/186; 335/192
[58] Field of Search .......... 340/252 R; 335/31, 186, 335/192, 196

[56] References Cited

U.S. PATENT DOCUMENTS 2,298,068  10/1942  Pierce ........................ 335/192 X
2,611,843  9/1953  Bourne ...................... 340/252 R X Primary Examiner—John W. Caldwell, Sr.
Assistant Examiner—Daniel Myer
Attorney, Agent, or Firm—James R. O'Connor

[57] ABSTRACT

A mechanically actuable electrical control relay has normally open contacts at least one of which is associated with a movable armature. A fixed, magnetizable core part has a winding or coil associated therewith. A movable core part associated with the armature is connected to a mechanical actuator for moving the movable core part toward the fixed core part. With the winding or coil energized, the fixed core part is magnetized and the movement of the movable core part (which is of a ferrous material) into proximity to the fixed part completes a magnetic circuit therebetween and the contacts are closed to establish and maintain an electrical circuit controlled by the relay. Improved circuitry for operating automotive equipment in which the control relay is one of the components is also described.

7 Claims, 4 Drawing Figures

MECHANICALLY ACTUABLE CONTROL RELAY

BACKGROUND OF THE INVENTION

As one will readily appreciate, the space available for mounting various control devices and their associated circuitry is quite limited in compact and subcompact automobiles. Further, the smaller size engines in such vehicles are more difficult to start and keep running if additional loads are placed on the engine during start and warm-up. In most ignition systems additional loads are electrically disconnected when the ignition key is turned to the start or crank position. When the key is allowed to return to the run position, however, additional loads, for example, air conditioners, rear window deicers, etc., are frequently energized while the engine is struggling thus making it more difficult for the operator to keep the engine running. By way of a specific example, one might consider the circumstances where a compact, air-conditioned vehicle has been driven for some period of time on a hot day with the air conditioner operating for maximum cooling. When the driver stops the vehicle and turns off the ignition switch, the air conditioner is deenergized, however, its control switch which is usually manually operated is often left in the on position. When the operator later restarts the engine and the key moves to the run position, the air conditioner is immediately energized and its load is thrown into the circuitry of the struggling engine as above mentioned.

Thus, the principal motivating objectives which led to the development of the present invention were (a) to provide a simple yet efficient mechanically actuable control device which would replace a plurality of parts such as separate switches, relays, wiring harnesses, etc., which have been characteristic of automotive control circuitry, which device would be particularly adapted for use in subcompact vehicles having limited mounting space; and (b) to provide a manually actuable control device for use in an automotive circuit including the ignition switch, which device, would have typical characteristics of a relay, to wit, it would hold in once its magnetic circuit was completed and automatically drop out when its coil or winding was deenergized, in this particular application by turning off the vehicle ignition switch, but could be selectively, mechanically (in most instances manually) actuated or deactuated by the driver or another occupant of a vehicle.

The fact that the aforesaid objectives have been accomplished through the development of a unique but relatively simple and inexpensive device will be best understood by one who proceeds to a reading of the detailed description of a preferred embodiment of the invention which follows hereinafter. The reader will also become apprised of additional improvements in the art which the invention represents and many will undoubtedly envision applications, other than those above mentioned, in which the invention could readily be used to advantage.

SUMMARY OF THE INVENTION

A control relay has a winding, a fixed core part which is magnetized when the winding is electrically energized, a movable core part which is normally biased to a gapped position relative to the fixed core part, an armature, and normally open input and output contacts. The output contacts are mounted on the armature. The device also includes a mechanical actuator which is connected to the movable core part and is adapted when actuated to move the movable core part toward the fixed core part thereby reducing the original gap therebetween substantially to zero, closing the contacts to energize the winding and completing a magnetic circuit between said movable and fixed core parts.

DESCRIPTION OF THE PREFERRED EMBODIMENT

A mechanically acutable control relay 10 according to the invention includes a relay substructure generally designated 11, which relay substructure is in many aspects the same as that disclosed in my U.S. Pat. No. 4,003,011 issued Jan. 11, 1977, and a mechanically movable actuator substructure generally designated 12.

Figure 1:
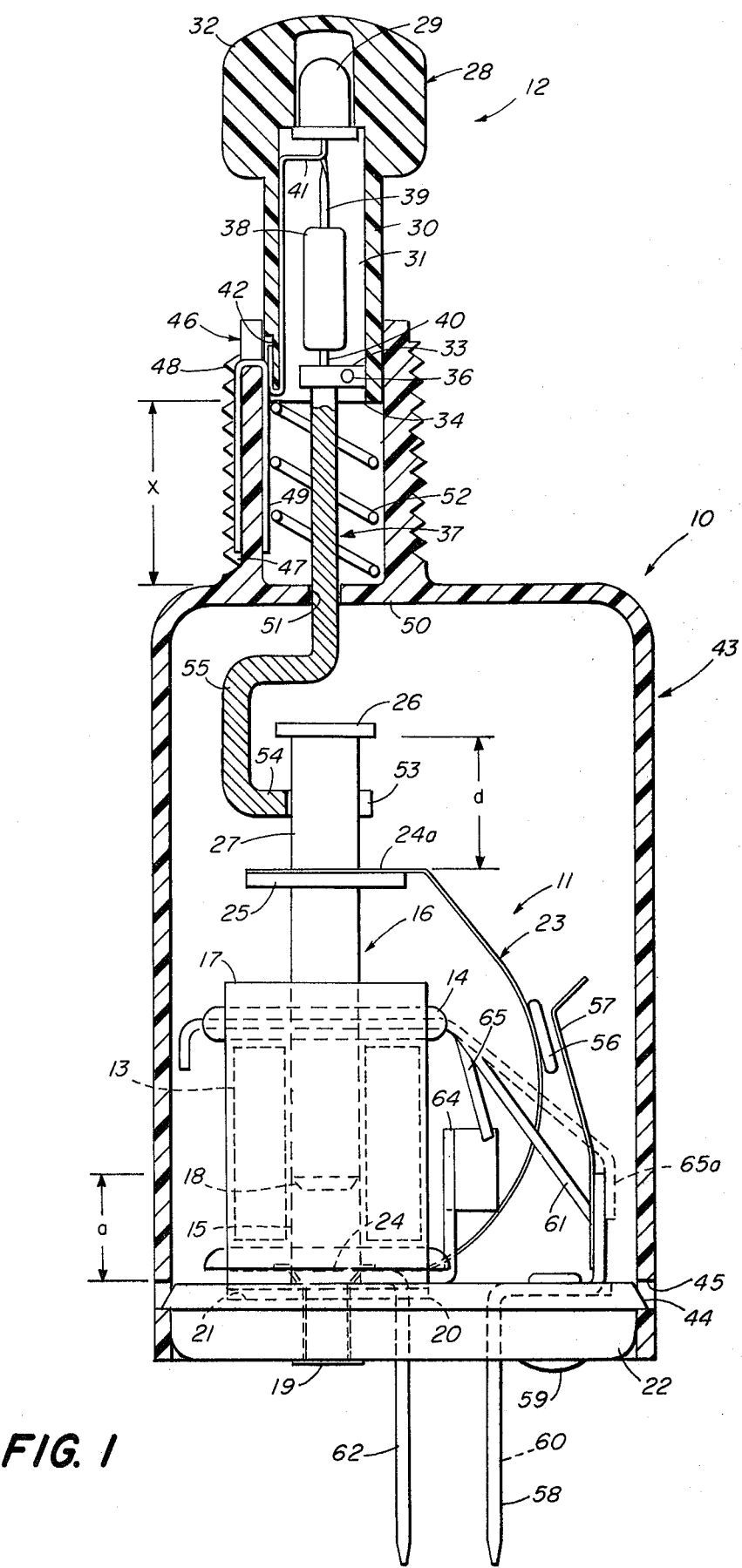
FIG. 1 is a side elevational view of a control relay according to the invention prior to actuation with certain parts being shown in transverse cross section.
Figure 2:
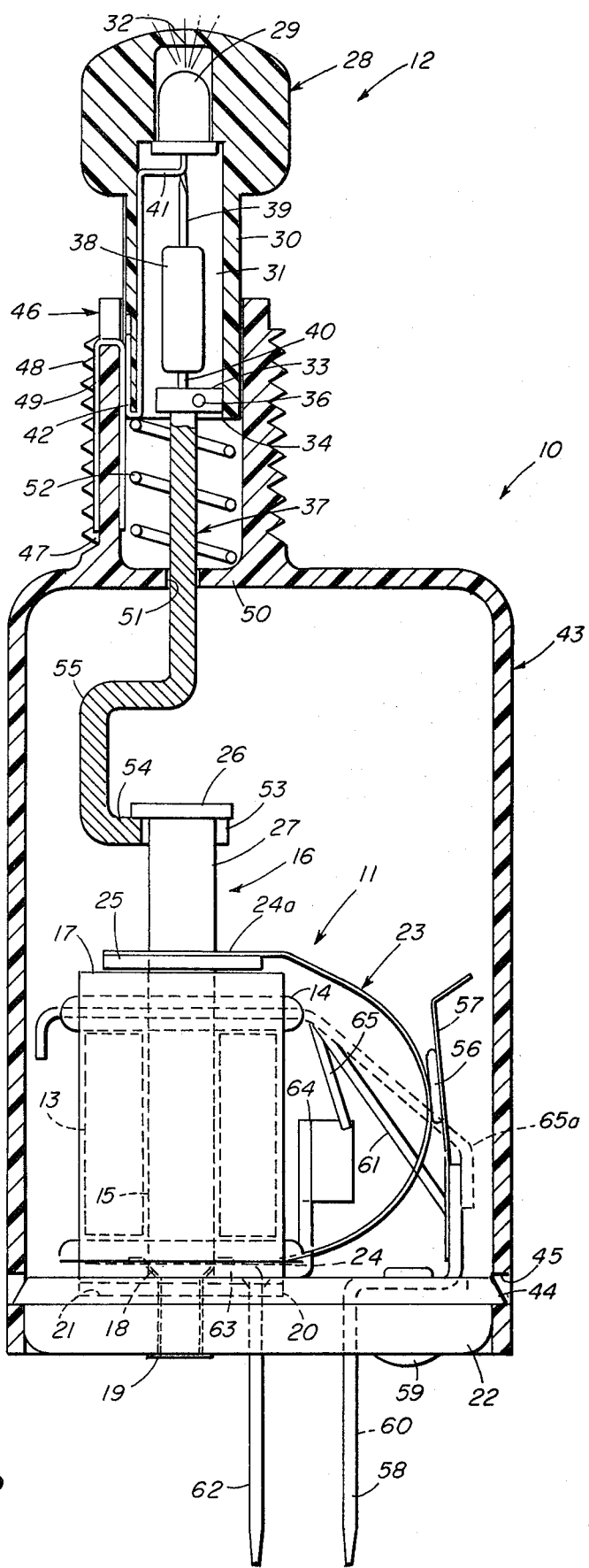
FIG. 2 is a view similar to FIG. 1 showing the control relay in its actuated condition.

In the relay substructure 11, a winding or coil 13 is wound about an insulate coil form 14. The coil form has an axial bore 15 extending centrally therethrough. A movable core part in the form of a plunger 16 is axially, slidably seated in the bore 15. A fixed core part 17 is disposed about the coil form 14 and winding 13 and the upper leg thereof has a through opening in registration with the bore 15, through which opening the plunger 16 passes. The movable and fixed core parts are formed when a magnetizable material according to the requirements of direct or alternating current design whereby upon coil 13 being energized and movable core part or plunger 16 being depressed by manual actuator 12 as will be described in further detail hereinafter, the air gap "a" (see FIG. 1) is reduced substantially to zero so that the plunger is drawn downwardly into the coil form and retained therein at a position (see FIG. 2) wherein the lower end 18 of the plunger engages a steel rivet 19 which fastens the bottom leg 20 of the fixed core part in a recess 21 provided in an insulate base 22.

The armature 23 is a C-shaped type which, in the terminology of the art, is often called an "obturator" and is formed from a springy sheet metal having excellent electrical conductivity, for example, spring bronze. One end 24 of the armature, the lower end as viewed in the drawing, is apertured and is clamped between the base of the coil form 14 and the bottom leg 20 of fixed core part 17 by rivet 19. From said clamped end the armature extends outwardly and upwardly in an arcuate configuration and thence back inwardly in arcuate form to a terminal end 24a which is spot welded or otherwise fixed to the upper surface of a shoulder 25 which is preferably formed from a ferrous metal and is fixed to and extends radially outwardly from the plunger 16. Ideally, the shoulder 25 is integral with the plunger. The plunger 16 also has an enlarged, radial, ideally integral, head portion 26 at its upper end. The length of the plunger between the shoulder 25 and head portion 26 defines a neck portion 27 and is of predetermined length "d" (see FIG. 1).

The mechanical actuator substructure 12 includes a molded, translucent, hollow, synthetic plastic part consisting of an outer knoblike end 28 and an intergral, downwardly extending shank 30 having an inner countersunk bore 31. A light emitting diode 29 which when electrically energized will project light through the end wall 32 of the knob 28, is seated in the upper, narrower end of bore 31. A bracket 33 is joined to the shank 30 adjacent the open end of 34 of the bore 31 by means of a pin 36 which fastens the bracket to the shank and also connects the upper end of a metal actuating arm 37 to the bracket. A resistor 38 which is also seated in the bore 31 has one of its leads 39 connected to the diode 29 and its other lead 40 connected to the actuating arm 37. A lead 41 from the diode 29 extends downwardly about the lower end wall of the shank 30 and thence upwardly in a slot 42 of limited length formed in the outer wall of the shank adjacent its open end 34.

An outer casing 43 is fastened to the insulate base 22 of the relay substructure 11 by lugs 44 on the base which snap seat in openings 45 in the casing. The casing has a hollow, externally threaded socket 46 extending from its upper end. The socket has an external groove 47 formed between portions of the thread 48 and a flat foil-like conductor 49 has a part thereof seated in the groove 47 and extends over the outer end of the socket to another part thereof lying along the inside wall of the socket. The shank 30 of the actuator member which has a width only slightly less than the internal width of the socket 46 is slidably seated in the socket such that the lead 41 of the diode is in sliding contact with the conductor 49. In a typical automotive mounting, the socket 46 projects through an opening in an electrically grounded sheet metal panel (not shown) and the casing is fastened to the panel by an internally threaded nut or collar (not shown) which engages the threads 48 and is torqued up against the panel to complete a current-carrying circuit from the panel through the conductor 49 to lead 41 to the diode 29. The socket 46 has an internal base wall 50 having a slot 51 extending centrally therethrough. A coil spring 52 of predetermined length "x" FIG. 1). which is seated in the socket bears against the base wall 50 and the open end 34 of the shank 30 and normally biases the knob 28 upwardly to the position shown in FIG. 1. At said position the fingers 53, formed from bifurcating the flange 54 of the lower end of the eccentric hooked portion 55 of the actuating arm 37, are disposed at approximately the midpoint of the length "d" of the neck portion 27 of the plunger 16 and the fingers are slidable along said neck portion.

Refocusing one's attention now on the relay substructure 11, one will observe that the armature 23 carries a contact 56 adapted when the armature is depressed or pulled in to engage the spring contact 57 in a sliding, tangential type engagement as is described in considerable detail in the copending patent application referred to above. Spring contact 57 is welded or otherwise fastened to the upper end of the blade terminal 58 which extends through the insulate base 22 and is fastened thereto by a rivet 59. A second similar terminal indicated by the phantom lead line of reference numeral 60 is located behind terminal 57 and extends through the base 22 and is similarly fastened thereto. One end of the winding coil 13 is connected to the upper end of the terminal 60 by a lead wire 61. A third terminal 62 which likewise extends through base 22 has a laterally extending flange 63 which is in electrical contact with the lower end 24 of the armature 23 and terminates in an upstanding post 64 which is connected to the other end of the coil by lead wire 65. In an alternative arrangement, lead 65 would not be connected to post 64, but rather directly to the upper portion of terminal 58 as indicated by the phantom lead line of reference numeral 65a.

THE OPERATION

Figure 3:
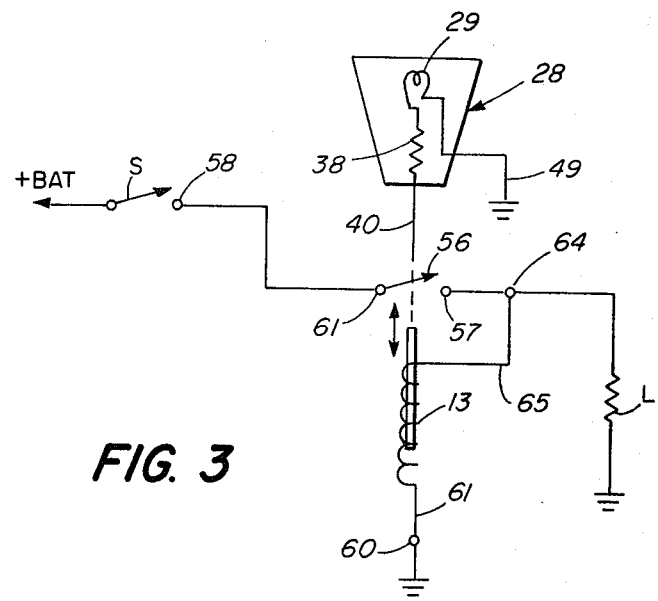
FIGS. 3 and 4 are schematic views of automobile control circuits including the control relay of the invention.

Having reference to FIG. 3, one will observe a typical automotive circuit embodying the control relay of the invention wherein the input terminal 58 is connected to one side of the vehicle ignition switch S, terminal 60 is connected to ground, and terminal 62 is connected to a load L, for example, the vehicle's air conditioner. With the mechanical actuator in the normally open position of FIG. 1, the relay contacts 56, 57 are open and the light emitting diode which is connected through conductor 49 to ground as aforesaid is not energized. When the vehicle is started or left running with the ignition switch S closed, the diode and load L remain unenergized. To activate the air conditioner, i.e., load L, the load 28 is manually pushed inwardly to compress coil spring 52 and slide the fingers 53 down along neck portion 27 of the plunger 16 to engage the armature end 24a and move the shoulder 25 downwardly toward the fixed core part 17. As the plunger 16 is thus depressed into the coil form 14, the armature 23 bows outwardly so that the contacts 56,57 are closed thereby energizing the winding 13 and the plunger is pulled downwardly by the resultant completion of the magnetic circuit to the position shown in FIG. 2 where the air gap "a" is substantially reduced to zero. With the relay thus locked in against the bias of the coil spring 52, positive voltage from the vehicle battery is applied to the load L through the relay to energize the load and voltage is likewise applied to the light emitting diode 29 through the actuator arm 37 and resistor 38. The light projected from the diode through the end wall 32 of the knob 28 provides indication to the operator that the contacts 56,57 are in fact closed and the air conditioner is turned on. It should be noted that even though the coil spring 52 continues to exert an upward bias on the shank 30 of actuator 12, the holding power of the relay which pulls the head portion 26 of the plunger down against the fingers 53 of actuating arm 37 is sufficiently strong to prevent the device from releasing even though manual or otherwise externally applied force or pressure on the knob 28 is removed.

There are two ways in which the air conditioner or load L can be deenergized: (1) by manually or otherwise pulling the mechanical actuator back toward the FIG. 1 condition; or (2) by turning off the vehicle ignition, i.e., opening switch S. In (1) the magnetic circuit between the plunger 16 and fixed core part 17 is mechanically broken and coil spring 52 drives the actuator outwardly. In (2) the coil 13 is deenergized and the magnetic circuit is broken electrically with the coil spring 52 again driving the actuator outwardly. It is significant to note that when the contacts 56,57 are open and the magnetic circuit between the fixed core part 17 and the movable core part, i.e., plunger 16 is broken, the device will immediately drop out to immediately break the electrical circuitry in the manner which is characteristic of an efficient relay as will be well understood by those having familiarity with the relay art. Thus, even if the vehicle operator is holding onto the knob 28 of the actuator, the disconnecting action of the relay will continue so long as the aforesaid magnetic circuit is broken regardless of whether the mechanical actuator is inadvertently held in some intermediate position between those depicted in FIGS. 1 and 2. To further emphasize this point, it should be explained that in deactivating the control relay manually there are two actions which take place and either one will operate to break the electrical circuit. If, during the outward pull of the mechanical actuator, the contacts 56,57 are opened, the coil 13 will immediately be deenergized and the relay will drop out. Likewise when the magnetic circuit or sealing action between the fixed and movable core parts is broken, the natural drop out characteristics of the relay take over. It is thus not always necessary to open the contacts 56,57 to cause the relay to drop out. As the plunger or movable core part is drawn upwardly in the coil form bore, a point is reached where the natural drop out of the relay takes over and opens the contacts. For a given application, the relative point at which this natural drop out will occur can be predetermined by varying the design of spring contact 57 and its angular orientation relative to the armature and also by selecting the point where contact 56 is attached to the armature to provide the optimum relay design and operating characteristics desired for a particular application in which the control device of the invention is to be utilized.

Figure 4:
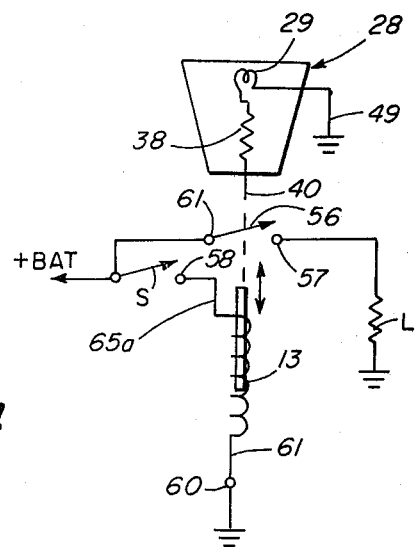

In the circuit depicted in FIG. 3, the ignition switch S is connected in series between the battery and load and carries all the current flowing to the control relay. In certain vehicles, ignition switches are not capable by design of carrying the heavy currents required for certain loads, for example, 40 amps for many rear window deicer mechanisms. Thus, it has been found preferable in certain vehicle applications to connect the load directly to the battery through the control relay and the ignition switch in parallel with the load. As above mentioned this alternative circuit requires connection of leads 65 from the coil 13 to terminal 58 and not to post 64. As is obvious from the schematic of FIG. 4, the coil will then be energized at any time that the ignition switch S is closed. Therefore, the coil must be of an impedance designed to minimize current drain. The coil in this instance is strictly a holding coil and the plunger 16 will not pull in unless manually depressed due to the overall design of the unit. Otherwise, the operation of the control relay to energize or deenergize the load is substantially the same as earlier described.

I claim:

1. A control relay comprising an insulate base, an electrically nonconductive coil form part joined to said base and having an axially extending bore formed therein, a relay coil wound about the external surface of said coil form part, a fixed core part disposed about said coil form part, said fixed core part having an opening therethrough in registration with said bore and being magnetizable responsive to electrical energization of said coil, a removable core part in the form of a plunger slidably seated in said opening in said fixed core part and said bore in said coil form part, said plunger having a radial shoulder proximate one end thereof normally located in spaced superposed relationship to said fixed core part, the end of said plunger remote from its end proximate said shoulder being normally disposed in said bore in said coil form part proximate but gapped from the end of said bore proximate said base, a spring metal armature having two ends, one of which is fixed to said coil form part proximate said base and the other end of which is fixed to said shoulder, a movable relay contact carried by said armature, a fixed contact fastened to said base and rising therefrom to a position where it is engageable by said movable contact responsive to downward movement of said plunger in said coil form part to substantially close the gap between the said end of said plunger remote from said shoulder and the end of said bore proximate said base, at least a pair of current carrying terminals fixed to said base, one of said terminals being electrically connected to one end of said relay coil and the other of said terminals being electrically connected to said fixed contact and the other end of said relay coil, a relay housing joined to said base, and a mechanical actuator mounted on said housing and operably connected to said plunger at said shoulder, said actuator being operable to depress said plunger into said coil form part and thereby move said armature to a position where said movable and fixed contacts are engaged and said relay coil is energized.

2. A control relay according to claim 1 including an electrical illuminator physically associated with said mechanical actuator, said illuminator being adapted to be energized responsive to the closing of said contacts.

3. A control relay according to claim 2 wherein said mechanical actuator includes a metallic actuating arm which is electrically connected in a series circuit between said illuminator and said movable contact through said armature and said plunger.

4. A control relay according to claim 3 wherein said mechanical actuator includes a nonmetallic, electrically nonconductive, substantially hollow member, said member being physically connected proximate one end thereof to said actuating arm, said member having a knoblike end remote from said one end, said knoblike end being translucent and housing said illuminator therein.

5. A control relay according to claim 1 wherein said plunger includes a head portion at its end remote from its end disposed in said bore, said head portion being axially spaced from said shoulder to define a neck portion therebetween.

6. A control relay according to claim 5 wherein said mechanical actuator includes an actuating arm which is slidably connected to said neck portion of said plunger.

7. A control relay according to claim 6 wherein said armature is of generally "C" shape and said movable contact is fixed to said armature at an arcuate portion thereof intermediate said armature ends, whereby said armature is compressed axially and bowed laterally outwardly to close said contacts responsive to downward movement of said plunger into said coil form part.

* * * * *